(12) United States Patent
Ellard et al.

(10) Patent No.: US 8,825,938 B1
(45) Date of Patent: Sep. 2, 2014

(54) USE OF WRITE ALLOCATION DECISIONS TO ACHIEVE DESIRED LEVELS OF WEAR ACROSS A SET OF REDUNDANT SOLID-STATE MEMORY DEVICES

(75) Inventors: Daniel J. Ellard, Belmont, MA (US); Hooman Vassef, Arlington, MA (US)

(73) Assignee: NetApp, Inc., Sunnyvale, CA (US)

( * ) Notice: Subject to any disclaimer, the term of this patent is extended or adjusted under 35 U.S.C. 154(b) by 746 days.

(21) Appl. No.: 12/058,476

(22) Filed: Mar. 28, 2008

(51) Int. Cl.
*G06F 12/02* (2006.01)

(52) U.S. Cl.
USPC .................................. 711/103; 711/E12.008

(58) Field of Classification Search
None
See application file for complete search history.

(56) References Cited

U.S. PATENT DOCUMENTS

| | | | |
|---|---|---|---|
| 5,548,724 A | | 8/1996 | Akizawa et al. |
| 5,680,579 A | | 10/1997 | Young et al. |
| 6,289,471 B1 * | | 9/2001 | Gordon ........................ 714/6.12 |
| 6,772,199 B1 | | 8/2004 | Keller, Jr. et al. |
| 8,621,145 B1 | | 12/2013 | Kimmel et al. |
| 2005/0114589 A1 * | | 5/2005 | Lofgren et al. ............... 711/103 |
| 2006/0004957 A1 | | 1/2006 | Hand et al. |
| 2007/0083724 A1 * | | 4/2007 | Kitamura ...................... 711/163 |
| 2007/0198796 A1 | | 8/2007 | Warren |
| 2007/0208904 A1 | | 9/2007 | Hsieh et al. |
| 2007/0260811 A1 * | | 11/2007 | Merry et al. .................. 711/103 |
| 2007/0294490 A1 * | | 12/2007 | Freitas et al. ................. 711/154 |
| 2008/0140918 A1 * | | 6/2008 | Sutardja ........................ 711/103 |
| 2008/0215800 A1 * | | 9/2008 | Lee et al. ...................... 711/103 |
| 2008/0228997 A1 * | | 9/2008 | Farhan et al. ................. 711/103 |

OTHER PUBLICATIONS

Gal, E. and Toledo, S. 2005. Algorithms and data structures for flash memories. *ACM Comput. Surv.* 37, 2 (Jun. 2005), 138-163.
EMC Press Release, "EMC² ® Where Information Lives®, EMC in Major Storage Performance Breakthrough; First with Enterprise-Ready Solid State Flash Drive Technology", http://www.prnewswire.com/mnr/emc/31368, 3 pages, Webcast: David Donatelli Discusses EMC's Latest Storage Innovation (Jan. 14, 2008).
EMC Data Sheet, "EMC Symmetrix DMX Series, The World's Most Trusted Storage Platform", 8 pages (publication date unknown).
Rabin, T. and Ben-Or, M. 1989. Verifiable secret sharing and multiparty protocols with honest majority. In *Proceedings of the Twenty-First Annual ACM Symposium on theory of Computing* (Seattle, Washington, United States, May 14-17, 1989). D. S. Johnson, Ed. STOC '89. ACM, New York, NY, 73-85.
Ellard, D. and Megquier, J. 2005. DISP: Practical, efficient, secure and fault-tolerant distributed data storage. *Trans. Storage* 1, (Feb. 1, 2005), 71-94.

(Continued)

*Primary Examiner* — Charles Rones
*Assistant Examiner* — Ryan Dare
(74) *Attorney, Agent, or Firm* — Perkins Coie LLP (57) ABSTRACT

Redundant solid-state memory devices are used to enhance the operation of a network storage system. To reduce the likelihood of substantially concurrent failure of two or more such memory devices, write allocation decisions are made so as to influence the wear on the various solid-state memory devices, so that not all of the solid-state memory devices wear out at the same rate. This can be accomplished by skewing the wear caused by erases/writes, across the solid-state memory devices, so that the devices experience unequal wear and, therefore, do not all fail at or approximately at the same time. The roles of the various flash devices are adjusted when a solid-state memory device is replaced, such that subsequent write allocation decisions are based on the maintenance history (e.g., replacement history) of the devices as well as the past write history.

28 Claims, 6 Drawing Sheets

(56) References Cited

OTHER PUBLICATIONS

Co-Pending U.S. Appl. No. 12/697,129, filed Jan. 29, 2010.
Adam Leventhal, "Flash Storage Memory", Communications of the ACM, vol. 51, No. 7, pp. 47-51, Jul. 2008.
"NetApp Accelerates Costs Savings, Boosts Performance with Solid-State Technologies," NetApp—Company-News@NetApp, pp. 1-3, Feb. 3, 2009.
NetApp Performance Acceleration Module, "Boost Performance Without Adding Disk Drives", http://www.netapp.com/us/communities/tech-ontap/pam.html; pp. 1-4, Sep. 2008.
NetApp-Storage Nuts & Bolts: Performance Acceleration Module, http://blog.netapp.com/storage_nuts_n_bolts/2008/08performance, pp. 1-3, Aug. 21, 2008.
"Page Replacement Algorithm", Wilkipedia, the Free Encyclopedia; http://en.wikipedia.org/wiki/Page_replacement_algorithm, pp. 1-9, Dec. 15, 2009.
"ReadyBoost", Wikipedia, the free encyclopedia; http://en.wikipedia.org/wiki/Readyboost Dec. 15, 2009; pp. 1-5.
Sun Microsystems; "Solaris™ ZFS™ Enables Hybrid Storage Pools-Shatters Economic and Performance Barriers"; Nov. 2008; pp. 1-4.
Wood, et al, "Flash Memory Technology in Enterprise Storage Flexible Choices to Optimize Performance" NetApp White Paper: Nov. 2008; pp. 1-10.
David Donateill, "EMC Symmetrix DMX Series", Webcast David Donatelli Discusses EMC's Latest Storage Innovation, pp. 1-9, (2008).
Chiang, et al., Using Data to Improve Cleaning Performance for Flash Memory. Mar. 3, 1999 [online], [retrieved on May 7, 2012]. Retrieved from the Internet <URL:http://citeseerx.ist.psu.edu/viewdoc/download;jsessionid=A65B502AA147CBACE355E491A957CCEA?doi=10.1.1.26.7926&rep=rep1&type=pdf>.
Non-Final Office Action Mailed May 11, 2012 in Co-pending U.S. Appl. No. 12/697,129 of Kimmel, J.S., et al., filed Jan. 29, 2010.
Final Office Action Mailed Dec. 6, 2012 in Co-pending U.S. Appl. No. 12/697,129 of Kimmel, J.S. et al., filed Jan. 29, 2010.
Non-Final Office Action Mailed Aug. 5, 2013 in Co-pending U.S. Appl. No. 12/697,129 of Kimmel, J.S. et al., filed Jan. 29, 2010.
Notice of Allowance Mailed Nov. 12, 2013 in Co-pending U.S. Appl. No. 12/697,129 of Kimmel, J., et al, filed Jan. 29, 2010.

* cited by examiner

USE OF WRITE ALLOCATION DECISIONS TO ACHIEVE DESIRED LEVELS OF WEAR ACROSS A SET OF REDUNDANT SOLID-STATE MEMORY DEVICES

FIELD OF THE INVENTION

At least one embodiment of the present invention pertains to network data storage systems, and more particularly, to a technique for using write allocation decisions to achieve a desired level of wear across a set of redundant solid-state memory devices in a network storage system.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive drives (RAID)). A storage server also typically includes internal memory that is used as a buffer cache, to speed up the reading and writing of data from and to (respectively) the main mass storage system from a client's perspective. In conventional storage servers, this buffer cache typically is implemented in the form of dynamic random access memory (DRAM).

A storage server may be configured to service file-level requests from clients, as in the case of file servers used in a network attached storage (NAS) environment. Alternatively, a storage server may be configured to service block-level requests from clients, as done by storage servers used in a storage area network (SAN) environment. Further, some storage servers are capable of servicing both file-level and block-level requests, as done by certain storage servers made by Network Appliance, Inc. of Sunnyvale, Calif.

It is desirable to improve the performance of storage servers, and there are various ways of accomplishing this. One way is to reduce the latency associated with accessing a storage server's primary persistent storage subsystem or internal buffer cache. In this regard, flash memory has certain desirable properties. Flash memory generally has a very fast random read access speed compared to that of conventional disk drives. Also, flash memory is substantially cheaper than conventional DRAM and is not volatile like DRAM.

It is also desirable for a storage server to be able to boot quickly, particularly when used in a large-scale enterprise environment which experiences high volumes of data traffic. One way to accomplish this is to store the boot code for the storage server in flash memory. Flash is also well suited for this purpose because of its non-volatile nature and fast random read access properties.

One problem with flash memory, however, is that it tends to wear out after a finite number of erase-write cycles. In a system that is subject to heavy workloads, it is possible that a critical flash memory component will fail before the system has reached its expected lifespan. Failure of a memory component that is being used to store critical software or data can be disastrous.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described below is a technique for advantageously using solid-state memory in a network storage system, including a technique for using write allocation decisions to achieve a desired level of wear across a set of redundant solid-state memory devices in a storage server. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Solid-state memory, such as flash memory, can be used advantageously to enhance performance of a storage system, such as a network storage server. Such memory can be used as, for example, cache memory, primary persistent storage, or a boot device (i.e., to store boot code), or for any combination of these uses and/or other uses. Because flash memory tends to wear out, however, the techniques introduced here provide for the use of multiple redundant flash memory devices to store data and/or software, for any of the above-mentioned purposes, and/or for any other desired purpose(s). Note that in this description, flash memory is discussed only as an example of a type of memory that is suitable for these purposes. Any other type of solid-state memory with similar properties could be substituted for flash memory in various embodiments of the invention.

In certain embodiments, any data to be written to flash memory is written to more than one flash memory device in a redundant group of such devices, so that if a flash memory device fails, the data are still available. One concern that this technique raises, however, is that, while multiple flash memory devices can provide redundancy, it is nonetheless desirable that no two or more of the flash memory devices will fail at or approximately at the same time (where "devices" here can mean flash chips, DIMMs, solid-state drives (SSDs), etc.). Therefore, the techniques introduced here also include a way to reduce the likelihood that substantially concurrent failures of two or more solid-state memory devices will occur.

One way to accomplish this, as described further below, is to intelligently make write allocation decisions so as to influence the wear on the various redundant flash devices, so that not all of the flash memory devices wear out at the same rate or fail at (or approximately at) the same time. In other words, a desired wear policy can be implemented on the set of flash memory devices so as to influence their useful lifespans, by appropriately selecting locations in flash memory to which data are written. It is assumed for this purpose that the flash memory devices in a redundant set are all of the same general type and have approximately the same (albeit unknown) lifespan in terms of the number of erase-write cycles before failure.

In one embodiment, this technique is implemented by skewing the wear caused by erases/writes, across the flash devices, so that the flash devices experience unequal wear and, therefore, do not all fail at or approximately at the same time. This can be done by defining a write quorum size and then using only some, not all, of the possible quorums of that size when writing to the flash devices. In another embodiment, the wear is skewed by setting different limits, for the various flash devices, on the amount of data that can be written to the flash device during a given write operation. In yet another embodiment, wear skewing is accomplished by assigning data sets that have different update (write) frequencies to different flash devices; for example, data sets that are frequently updated (written to) may be assigned exclusively to one particular subset (i.e., two or more) of the flash devices, while another data set that is updated infrequently may be assigned exclusively to another subset (two or more) of the flash devices. The roles of the various flash devices are adjusted when a flash device is replaced, such that subsequent write allocation decisions are based on the maintenance history (e.g., replacement history) of the devices as well as the past write history.

In addition, flash memory chips generally have the ability to track how many of their internal storage blocks have failed. Consequently, each flash memory chip can be made to output a simple indication of how many of its storage blocks have failed, so that write allocation decisions can be made by an external entity based on the number of failed blocks within the various flash memory chips. For example, any flash chip with more than a predetermined threshold number of failed blocks may be treated as a read-only device and therefore excluded from future writes.

Network Environment

The example of a network storage system, and in particular a storage server, is discussed herein to facilitate explanation. It will be recognized, however, that the techniques introduced here can be applied to other types of processing systems and in other contexts.

Figure 1:
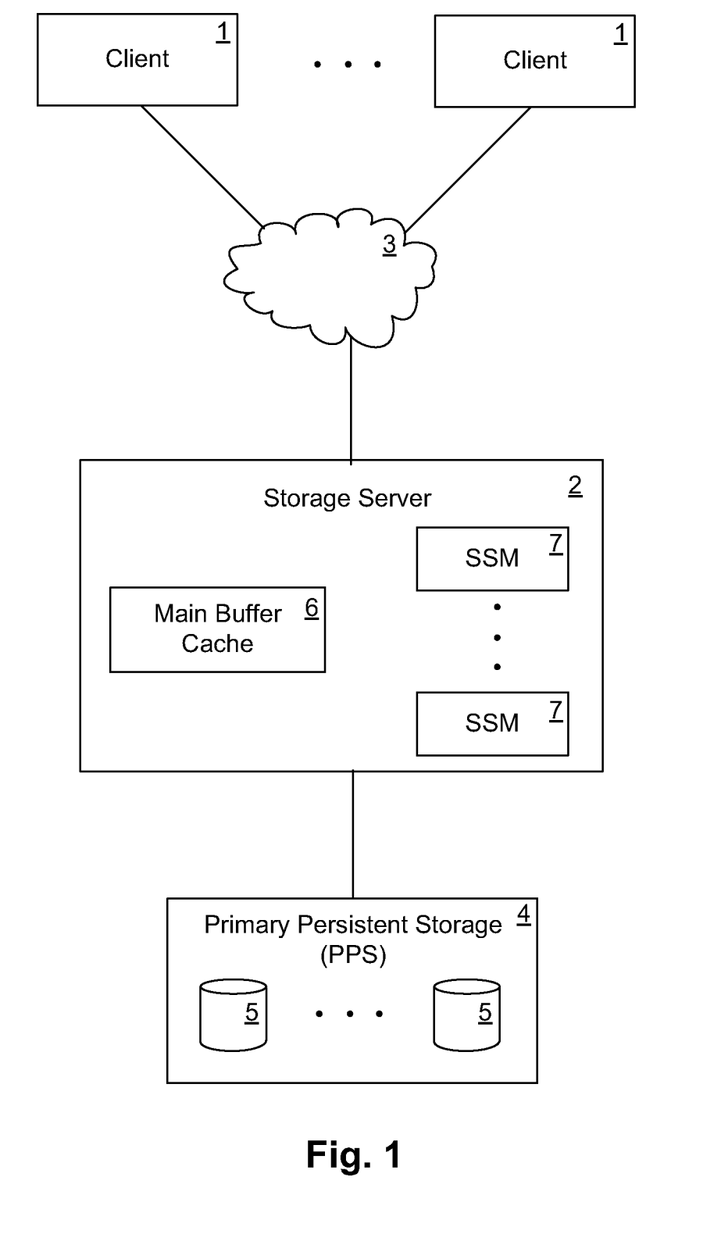
FIG. 1 illustrates a network storage system in which the present invention can be implemented.

Refer now to FIG. 1, which shows a network storage system in which the techniques introduced here can be implemented. In FIG. 1, a storage server 2 is coupled to a primary persistent storage (PPS) subsystem 4 that includes multiple non-volatile mass storage devices 5, and to a set of clients 1 through an interconnect 3. Each of the clients 1 may be, for example, a conventional personal computer (PC), server-class computer, workstation, handheld computing/communication device, or the like. The interconnect 3 may be, for example, a local area network (LAN), wide area network (WAN), metropolitan area network (MAN), global area network such as the Internet, a Fibre Channel fabric, or any combination of such interconnects, and may include one or more wired and/or wireless networks.

Storage of data in the PPS subsystem 4 is managed by the storage server 2. The storage server 2 receives and responds to various requests from the clients 1 relating to data storage or access (e.g., read and write requests), directed to data stored in or to be stored in the storage subsystem 4. The mass storage devices 5 in the PPS subsystem 4 can be, for example, conventional magnetic or optical disks or tape drives, or non-volatile solid-state memory, such as flash memory, or a combination of such devices. The storage devices in storage subsystem 4 can be organized as a Redundant Array of Inexpensive Disks/Devices (RAID), in which case the storage server 2 accesses the storage subsystem 4 using one or more well-known RAID protocols.

The storage server 2 also includes a main buffer cache 6, which can be implemented as DRAM, for example. Further, the storage server 2 includes a number of solid-state memory devices (SSMs) 7, which in certain embodiments are implemented as flash memory, as henceforth assumed here to facilitate description. In some embodiments, each individual SSM 7 is a flash memory chip, which may be mounted on a dual in-line memory module (DIMM), for example. In other embodiments, each SSM 7 is a DIMM which includes multiple flash chips. In still other embodiments, each SSM 7 is a flash-based SSD. One or more of the SSMs 7 may be used as boot devices (i.e., to store boot code for the storage server 2) and/or for various other purposes. In some embodiments, the SSMs can be used as elements of the PPS subsystem 4.

The storage server 2 may be a file-level server such as used in a NAS environment, a block-level storage server such as used in a SAN environment, or a storage server which is capable of providing both file-level and block-level service. Further, although the storage server 2 is illustrated as a single unit in FIG. 1, it can have a distributed architecture. For example, the storage server 2 can include a physically separate network module (e.g., "N-blade") and disk module (e.g., "D-blade") (not shown), which communicate with each other over an interconnect.

Figure 2:
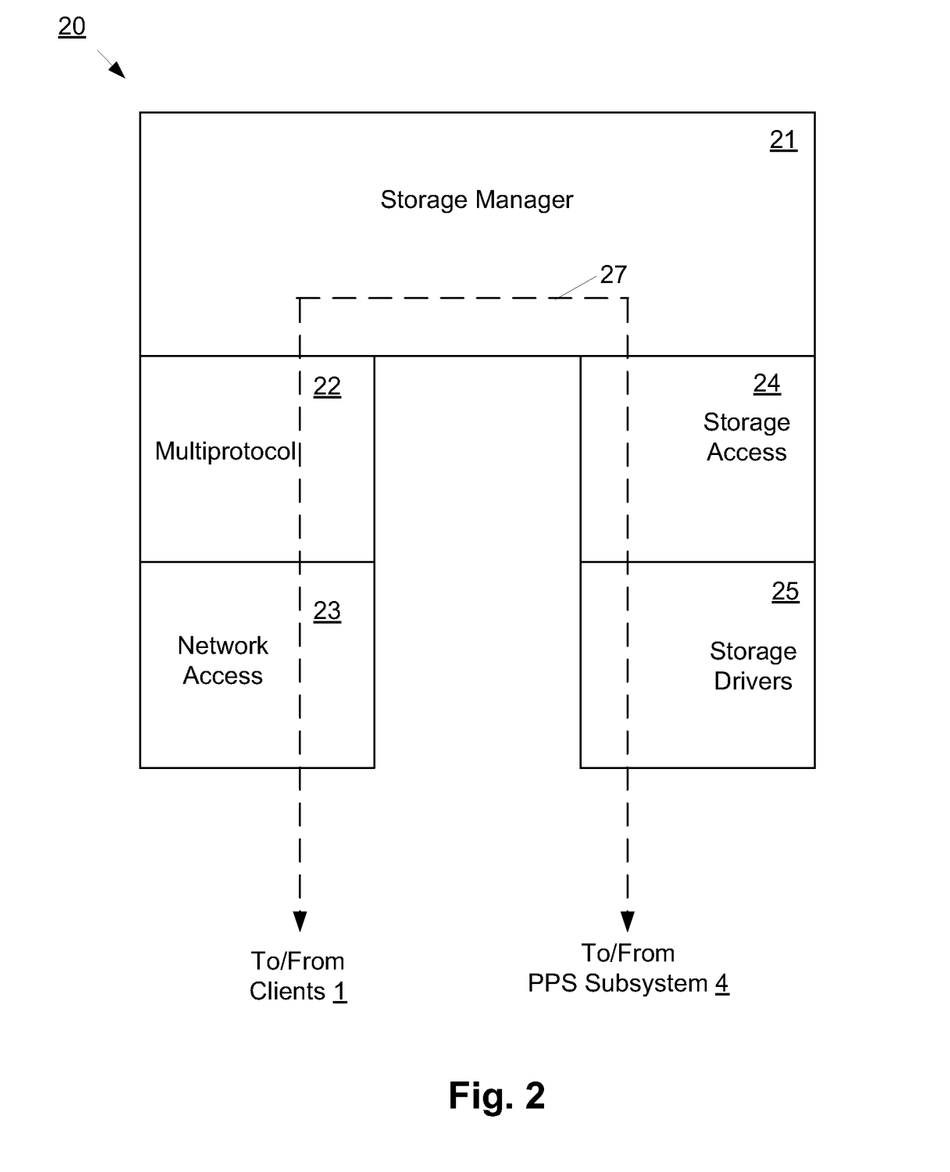
FIG. 2 schematically illustrates an example of a storage operating system that can be implemented in a storage server.

FIG. 2 schematically illustrates an example of a storage operating system that can be implemented in the storage server 2. In at least some embodiments, the storage operating system 20 is implemented as kernel-space software, which is executed by one or more processors within the storage server 2. In the illustrated embodiment, the storage operating system 20 includes several software modules, or "layers". These layers include a storage manager 21, which is the core functional element of the storage operating system 20. Among other functions, the storage manager 21 imposes a structure (e.g., a hierarchy) on the data stored in the PPS subsystem 4 and services read and write requests from clients 1. In certain embodiments, the storage manager 21 manages a log-structured file system and implements a "write out-of-place" (also called "write anywhere") policy when writing data to the PPS subsystem 4. In other words, whenever a logical data block is modified, that logical data block, as modified, is written to a new physical storage location (physical block), rather than overwriting the data block in place.

Logically "under" the storage manager 21, to allow the storage server 2 to communicate over the network 3 (e.g., with clients 1), the storage operating system 20 also includes a multiprotocol layer 22 and a network access layer 23. The multiprotocol 22 layer implements various higher-level network protocols, such as Network File System (NFS), Common Internet File System (CIFS), Hypertext Transfer Protocol (HTTP) and/or Internet small computer system interface (iSCSI). The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also logically under the storage manager 21, to allow the storage server 2 to communicate with the persistent storage subsystem 4, the storage operating system 20 includes a storage access layer 24 and an associated storage driver layer 25. The storage access layer 24 implements a higher-level disk storage protocol, such as RAID-4, RAID-5 or RAID-DP, while the storage driver layer 25 implements a lower-level storage device access protocol, such as Fibre Channel Protocol (FCP), small computer system interface (SCSI), serial attached SCSI (SAS), serial ATA (SATA), etc.

Also shown in FIG. 2 is the path 27 of data flow through the operating system 20, associated with a read or write operation, from the client interface to the PPS interface. Thus, the storage manager 21 accesses the PPS subsystem 4 through the storage access layer 24 and the storage driver layer 25. In some embodiments, the storage manager 21 can access the main buffer cache 6 and the SSMs 7 directly, i.e., without going through the storage access layer 24 and storage driver layer 25. In other embodiments, however, the storage manager 21 accesses the main buffer cache 6 and/or the SSMs 7 through the storage access layer 24 and storage driver layer 25, or through one or more separate software layers that perform similar functionality.

"Fingerprinting"—Write Process

The SSMs 7 can be arranged in a RAID-like manner to tolerate a fail-stop failure (a failure in which a device fails by stopping or shutting down) of one or more of the SSMs 7. RAID-like techniques can be extended to provide integrity guarantees in addition to availability guarantees. When a data item (which may be a sector or block of data, or an object composed via an intermediate mapping between hardware locations and object components, such as a file system or database) is written to a SSM 7, a "fingerprint" of the item is also computed (by the storage manager 21, for example). The fingerprint can be, for example, a cryptographic hash of the data represented by the item, although a simpler method, such as cyclic redundancy check (CRC), may be sufficient. After the data item is written to the SSM 7, the fingerprint is also written. In one embodiment, the data item and fingerprint are written in the same manner to all of the SSMs 7. This operation may occur in parallel (with all the SSMs 7 written concurrently), or it may be done serially (each SSM 7 is written in turn), or in any other order. In other embodiments, to accomplish wear skewing, the data item and fingerprint are written to some, but not all, of the SSMs 7, as described further below.

The write operation is considered complete when a quorum of the SSMs 7 has been successfully written. A "quorum" is defined here as the minimum number of devices which must successfully perform a particular action (e.g., a read or write) in order for that action to be considered successful or valid. As long as an attempt is made to write to two or more of the SSMs 7, even if some of the individual writes fail the operation is considered a success as long as a quorum of the writes succeed (because that means, in the absence of any further failures, the data item can be correctly read). Note that different operations (read, write, etc.) can have different quorum sizes. The write quorum size is made larger than the read quorum size to ensure that if a device fails between the write and read, the read quorum can still be achieved.

The fingerprint of a data item may be stored with the data item (for example, as part of metadata associated with the data item by the storage manager 21), or it may be stored in a separate area of the storage system, or in a special file, table, database, etc., that is reserved for representing the mapping between an identifier of each data item and its fingerprint. The first approach works well when the fingerprinted items are file system objects (such as file and directories) that already have associated metadata. The second approach is more appropriate for data items that do not already have an associated metadata mechanism, such as raw data blocks. In either case, the storage server 2 is designed so that, given the identifier or locator for the data item, it is possible to find the identifier for the fingerprint of that item.

Figure 3:
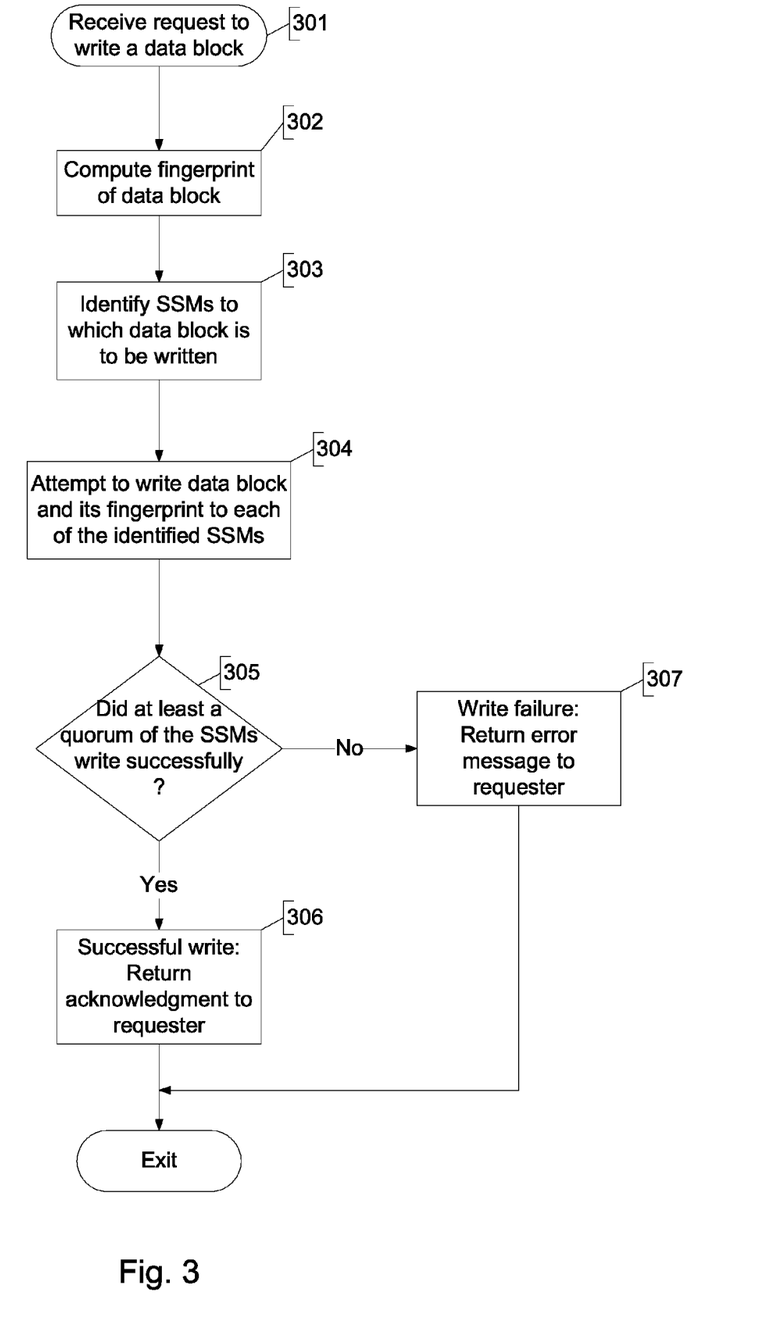
FIG. 3 is a flow diagram showing an example of process for writing a data block.

FIG. 3 illustrates an example of the write process that may be performed within the storage server 2. The process may be performed by, for example, the storage manager 21. To simplify explanation, the process is explained in the context of writing a single data block. In this context, it is assumed that a data "block" is the smallest unit of data that is handled and managed by storage manager 21. In one embodiment, a data block is a 4 kB unit of data; however, other sizes of data blocks could alternatively be used with the techniques described here. It will be understood that the described process can be applied for each data block that is written, and further, that data blocks may be written in batches or streams.

Initially, a request to write a data block is received at 301. The request may have been initiated by an external client 1, or it may have been generated by another software layer or module within the storage server 2. At 302 the storage manager 21 computes the fingerprint of the data block (using, e.g., a hash function, CRC, etc.). The storage manager 21 then identifies the SSMs 7 to which the data block is to be written at 303. As noted above, in one embodiment an attempt is made to write the data block to all of the SSMs 7. In other embodiments, as described further below, an attempt is made to write the data block to more than one, but not all, of the SSMs 7, in order to accomplish wear skewing.

The storage manager 21 then attempts at 304 to write the data block and its fingerprint to each of the SSMs that were identified at 303. Next, the storage manager 21 determines whether at least a quorum of the SSMs report that they have written the data block successfully 305. If the outcome of 305 is affirmative, this means that the write operation was successful; in that case, an acknowledgment of successful write operation is returned to the requester at 306. If the outcome of 305 is negative, then this means that the write operation failed, in which case an error message is returned to the requester at 307.

The above is just one example of a write process. Many variations upon this process are possible in conjunction with the techniques being introduced here. For example, the above described example of a write process reflects a scheme in which data is mirrored across multiple SSMs 7. However, in other embodiments, the technique introduced here can also be applied with non-mirroring encodings of the data, such as RAID-4, RAID-DP or other erasure codings. In one such implementation, an additional operation is added between 303 and 304, above, to compute the encoding (or "shares") of the block that is going to be written to each of the devices.

It should also be noted that the system can be designed to tolerate the loss of more than one flash memory device. For example, instead of simple mirroring, a redundancy scheme such as RAID-DP, RAID-TP, or any other arbitrary coding scheme that enables arbitrary numbers of failures to be tolerated, could be used.

"Fingerprinting"—Read Process

To read a data item, the storage manager 21 first selects an SSM 7 from which to read the data item. If some of the SSMs 7 have failed or are inconsistent, the selection process continues until a working SSM 7 is found. The data item is read from that SSM 7, and (in parallel or serially) the fingerprints for that data item are read from one or more other working SSMs 7. The fingerprint of the item stored on the original SSM 7 can also be compared to the computed value of the fingerprint; if these do not match, then it is almost certain that the data has been corrupted in some manner. If a quorum of the SSMs 7 returns the same fingerprint, and that fingerprint matches the fingerprint of the read data (as computed by the reader, when the item is retrieved from the media), then the data are considered correctly read. Otherwise, additional instances are read from other SSMs 7 until one is found that matches the fingerprint agreed upon by the quorum. (For this purpose, the number of SSMs 7 that make up a quorum depends on how many faults can be tolerated in any particular embodiment.)

If no data item that matches a quorum of the fingerprints is found, then the read may be considered to have failed, or the quorum protocol may be relaxed to permit a smaller quorum (or a quorum containing a single device, if only one SSM 7 is present). If the read fails, this condition may represent a fatal error (because the system is in an inconsistent state, or the data cannot be verified), or it may be possible for the system to recover if the system retains multiple versions of data objects and can use another. For example, if a particular "snapshot" (persistent point-in-time image of a data set) contains corrupt or unreadable data blocks, it may still be possible for an earlier snapshot to be correct and readable. In this case, at the discretion of the operator, the system may use an older version of the contents of the storage system.

When the read protocol halts, the storage manager 21 either has a copy of the original data, as witnessed by the quorum of fingerprints that match the data, or a quorum cannot be achieved, or the data has been corrupted. If a quorum cannot be achieved, the quorum requirements can be relaxed. In the worst case, the storage server 2 can function correctly (although with degraded assurance of correctness) when only one SSM 7 is working correctly.

Figure 4:
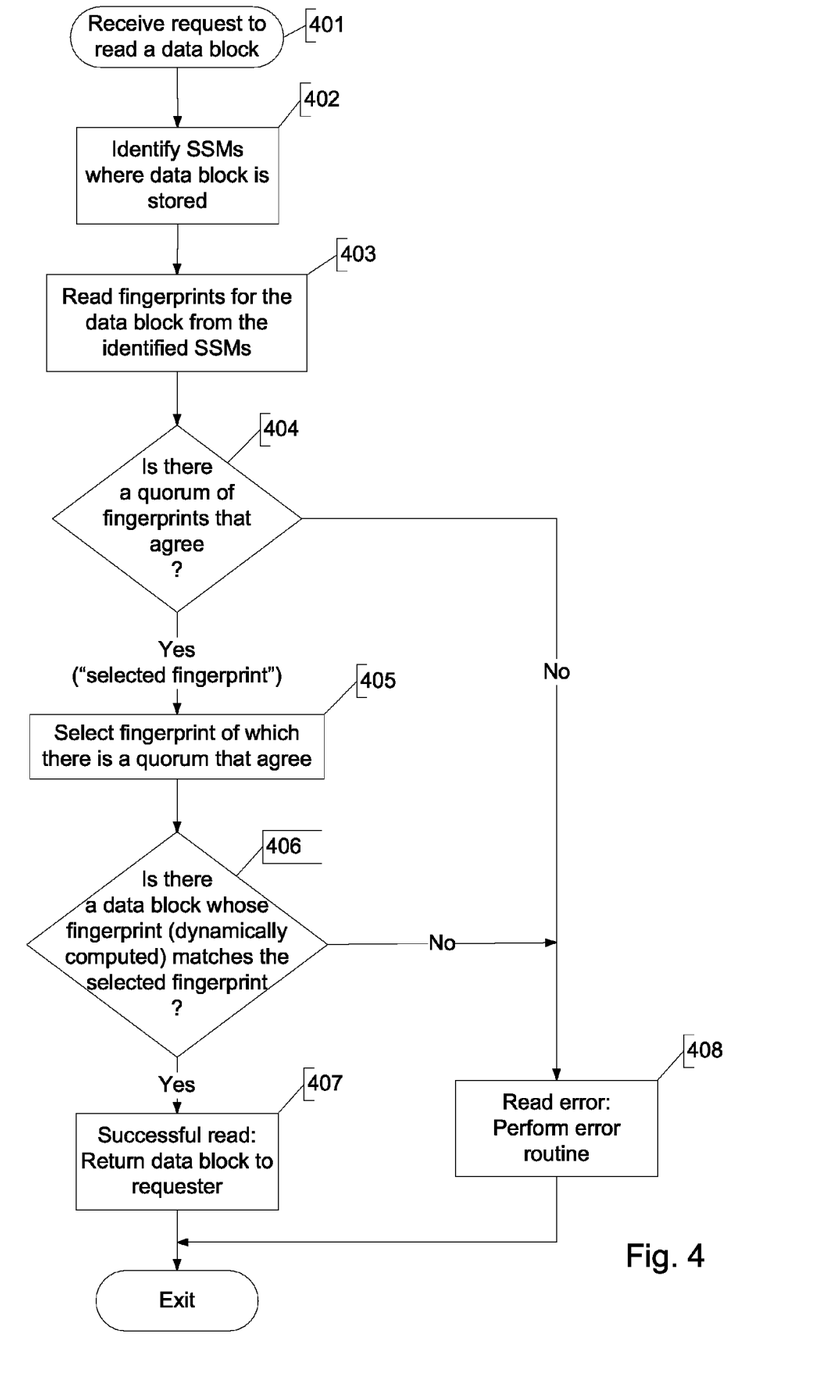
FIG. 4 is a flow diagram showing an example of process for reading a data block.

FIG. 4 illustrates an example of the read process that may be performed within the storage server 2. The process may be performed by, for example, the storage manager 21. As with FIG. 3, the process of FIG. 4 is explained in the context of reading only a single data block, to simplify explanation.

Initially, a request to read data block is received at 401. The request may have been initiated by an external client 1, or it may have been generated by another software layer or module within the storage server 2. The storage manager 21 then identifies two or more of the SSMs 7 in which the data block is stored at 402. To determine this, the storage manager 21 can consult a map of where all data blocks are stored, which it maintains for this purpose for all files, volumes, etc. which it manages. At 403 the storage manager 21 reads the fingerprint associated with the referenced data block from each of the identified SSMs 7.

Next, the storage manager 21 determines at 404 whether at least a quorum (read quorum) of the stored fingerprints of the requested data block match. If a quorum of matching fingerprints is found, then the matching fingerprint value is taken to be the "selected fingerprint" at 405, and the storage manager 21 next determines at 406 whether any of the SSMs 7 contain a data block whose fingerprint, computed dynamically at this time, matches the selected fingerprint (since it is conceivable that a quorum of incorrect fingerprints could be found in 404, due to some error or data corruption). If there is such a match, then this is considered to be a successful read, in which case the first data block whose dynamically computed fingerprint matches the selected fingerprint is returned to the requester at 407. If a quorum of matching fingerprints is not found, or if a quorum is found but the selected fingerprint does not match the dynamically computed fingerprint of any stored data block, then this is considered to be a read error, in which case an error routine is performed at 408. The error routine can involve simply sending an error message to the requester. Alternatively, the error routine can involve relaxing the read quorum requirement and repeating the above process from 404. Various other actions may also be included or substituted.

The above is just one example of a read process. Many variations upon this process are possible in conjunction with the techniques being introduced here.

Wear Skewing

In the method described above, all of the SSMs 7 will receive approximately the same write workload, and therefore, are likely to wear out at approximately the same time. To avoid such an event, which could cause a critical failure (depending on how the SSMs 7 are used), one can replace SSMs on a staggered schedule that greatly reduces the likelihood of such a critical failure. Of course, it is also preferable to avoid having to replace an SSM before it has substantially reached the end of its lifespan, since that would be wasteful (while some "waste" may be designed in as part of the trade-off in any fault-tolerant system, the trade-off here would be particularly unfavorable).

A solution, therefore, is to make write allocation decisions in such a way as to influence the wear on the various redundant SSMs 7 unequally intentionally, so that not all of the flash SSMs 7 wear out at the same rate or fail at (or approximately at) the same time. Appropriate selection of the locations in SSMs 7 to which data are written, in accordance with a desired wear policy, can thereby influence the useful lifespans of the SSMs 7. It is assumed for this purpose that the SSMs 7 in a redundant set are all of the same general type and have approximately the same (albeit unknown) lifespan in terms of the number of erase-write cycles before failure.

Figure 5:
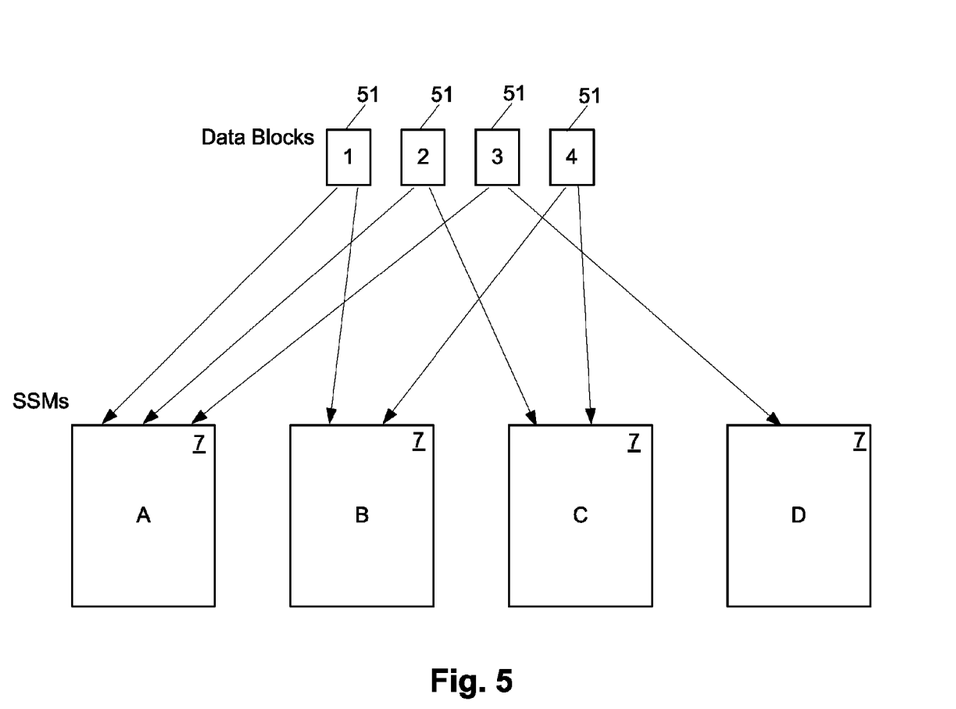
FIG. 5 illustrates an example of how writes can be allocated to different solid-state memory devices to achieve wear skewing through quorum selection.

In one embodiment, this technique is implemented by skewing the wear caused by erases/writes, across the SSMs 7, so that SSMs 7 experience unequal wear and, therefore, do not all fail at or approximately at the same time. This can be accomplished by defining a write quorum size and then using only some, not all, of the possible quorums of that size when writing to the flash devices. FIG. 5 illustrates an example of how this may be accomplished.

Assume that a storage server 2 includes four SSMs 7, designated A, B, C and D, assume further that the size of a write quorum is selected to be two SSMs 7; that is, any two SSMs 7 must produce the same fingerprint in order for the write to be considered successful. With four SSMs 7, there are six possible combinations of two SSMs, i.e., six possible quorums of two, which are: A & B, A & C, A & 0, B & C, B & D, and C & D. To accomplish wear skewing, the storage manager 21 can elect not to use all six possible quorums when writing data to the SSMs 7. For example, the storage manager may elect to use only four of the six possible quorums, for example, by using quorums A & B, A & C, A & D, and B & C, while not using quorums B & D and C & D.

A simple example of how this may be applied is as follows. Assume that the storage manager 21 needs to write four data blocks 51, designated blocks 1, 2, 3 and 4, to the set of SSMs 7, as shown in FIG. 5. The storage manager 21 can therefore write block 1 to SSMs A and B only, write block 2 to SSMs A and C only, write block 3 to SSMs A and D only, and write block 4 to SSMs B and C only. As a result, while each data block is redundantly stored, SSM A receives a total of three writes from this set of operations, SSMs B and C each receive two writes, and SSM D receives only one write, as indicated by the arrows in FIG. 5. This strategy can be applied indefinitely to a large number of writes over a long period of time. The overall result is that, while SSMs B and C will wear out at approximately the same rate, SSM A will wear out more quickly than the other SSMs, and D will wear out more slowly than the other SSMs. Thus, assuming no anomaly occurs to cause premature failure, the SSMs will not all fail or require replacement at (or approximately at) the same time.

In another embodiment, the wear is skewed across SSMs 7 by setting different limits, for the various SSMs 7, on the amount of data that can be written to an SSMs 7 during a given write operation. For example, even if all of the SSMs 7 have the same storage capacity, the storage manager 21 can treat at least some of them as having significantly less capacity than their actual capacity. As a more specific example, if SSMs A, B, C and D all have 32 GB capacities, the storage manager 21 might treat SSM A as having 32 GB capacity, SSM B as having 28 GB capacity, SSM C as having 24 GB capacity, and SSM D as having 20 GB capacity. As a result, those SSMs that are treated as having less capacity will tend to receive fewer writes than the others and, therefore, will wear out more slowly than the others.

Another way of accomplishing essentially the same result is that, in some embodiments, two or more of the SSMs 7 have significantly different storage capacities, but the storage manager at 21 treats them as having the same storage capacity; in other words, at least one of the SSMs is treated by the storage manager 21 as having significantly more or less capacity than it actually has.

In yet another embodiment, wear skewing is accomplished by assigning data sets that have different update (write) frequencies to different SSMs. For example, the data volumes (or files, or directories, etc.) that are most frequently updated (written to) in the storage server 2 could be assigned exclusively to SSM A, while data volumes (or files, or directories, etc.) that are least frequently updated could be assigned exclusively to SSM D, and data volumes (or files, or directories, etc.) that are updated with moderate frequency are assigned exclusively to SSMs B and C. However, since it is desirable to store all data redundantly, frequently updated data sets can be split across two or more SSMs. For example, half of a particular frequently-updated volume may be assigned to SSM A while the other half of that volume is assigned to SSM B.

There are at least four possible ways to implement wear skewing by assigning data sets that have different update frequencies to different SSMs. The first and perhaps simplest is a probability based approach for a write-out-of-place storage system. In this approach, each time a write is performed, a write quorum is selected randomly with a bias identical to the desired wear skew bias. If many writes are performed, then the laws of probability will work to skew the wear accordingly. (If relatively few writes are performed, then the issue of wear is insignificant.) This approach works in write-out-of-place systems, because the storage manager has choices about where to place data when they are overwritten with new values.

In another approach, a storage network administrator or some other entity creates and encodes policies about the various properties of different kinds of files (or other types of data sets) and how/where they should be stored. For example, one file may be a backup, so it is written once and then read a few times; another file may be a log file, so that it repeatedly gets overwritten; etc). The storage manager then uses these policies to decide where each file or directory (or other data set) should be written. Files and directories that will be written frequently are written on the devices that are intended to receive more wear.

Yet another approach is more dynamic in nature. A storage server can be configured to study the past behavior of different files or classes of files (or other types of data sets), make predictions about their future update patterns, and adjust its write behavior accordingly.

Still another approach is a hybrid system that combines elements of the first and third approaches described immediately above (probability-based and adaptive) and is suitable for write-in-place storage systems. This approach randomly chooses whether or not to move a block, file, etc. when it is updated, to a location most suitable for its recent update history.

In addition, flash memory chips generally have the ability to track how many of their internal storage blocks have failed. Consequently, an SSM 7 can be designed to output a simple indication of how many of its storage blocks have failed, so that write allocation decisions can be made by an external entity, such as the storage manager 21, based on the number of failed blocks within the various SSMs 7. For example, any SSM 7 with more than a predetermined threshold number of failed storage blocks may be treated as a read-only device and therefore excluded from future writes.

Other approaches to skewing the wear across SSMs are also possible. By using any of these approaches, the individual SSMs 7 can be replaced on a staggered or interleaved schedule, while still making substantially full use of the SSMs' effective lifespans.

Because the time to wear-out is not entirely predictable, one can estimate the time until wear-out by using conservative heuristics based on past data, and schedule replacements so that every SSM 7 is replaced before its anticipated wear-out, and so that only one SSM 7 (or a small subset of the SSMs 7) is replaced at a time, so that there is always a quorum of SSMs 7 available that are not near their expected wear-out time.

For example, assume that a particular storage server 2 includes three SSMs that are used in the manner described above, and that based on the reliability characteristics of these devices and the workload that the system is running, it is expected that each SSM will wear out after one year of use. One can set a conservative threshold for replacement of, for example, 75% of the expected life, which means (for this example) that one would arrange the schedule so as to never allow a SSM to be active in the system for more than nine months, to reduce the possibility that the device will wear out during use. The replacement schedule can be staggered so that after three months the first SSM is replaced, after six months the second SSM is replaced, and after nine months the third SSM is replaced. After one year, the replacement for the first SSM (which has now been in service for nine months) is replaced; and so on.

If all of the SSMs are new when this schedule begins, then when the first SSM is replaced, it is unlikely to be worn out; it should still have six months of life before it reaches its nine-month policy-mandated replacement time, and nine months before it is likely to fail. Therefore, this SSM need not be discarded, but instead it can be kept as a cold spare in case one of the other SSMs fails for any reason.

In the above-described wear skewing technique, each particular SSM 7 may be thought of as having a particular role, or utilization, for purposes of writing data. That is, some SSMs in the system have higher utilization (i.e., they receive more writes in a given period of time), whereas other SSMs in the system have lower utilization (i.e., they receive fewer writes in that period of time). The storage manager 21 can maintain metadata that indicates each SSM's role (utilization relative to the other SSMs) in any convenient location. When a particular SSMs 7 is replaced in the system, the various roles/priorities of each SSM should be modified accordingly, to continue to obtain consistent results from the wear skewing.

For example, using the above described example of SSMs A through D (FIG. 5), assume that SSMs A through D, respectively, are configured to receive writes from most frequently to least frequently, respectively, such that SSM A will wear out first and SSM D will wear out last. When SSM A wears out and/or is replaced, SSM B is reassigned to the role of SSM A, SSM C is reassigned to the role of SSM B, SSM D is reassigned to the role of SSM C, and the new/replacement SSM is assigned to role of SSM D.

Hence, assuming wear skewing is continued after replacing an SSM, subsequent write allocation decisions are based on the maintenance history (replacement history) of the SSMs (due to the reassignment of the various SSMs' roles when an SSM is replaced) as well as the past write history. Likewise, if an SSM is added to the storage system (the number of SSMs is increased), the roles of all of the SSMs will need to be modified to maintain consistent results from wear skewing. For example, a portion of the write load of each of the pre-existing SSMs could be reassigned to the new SSM.

Storage Server Architecture

Figure 6:
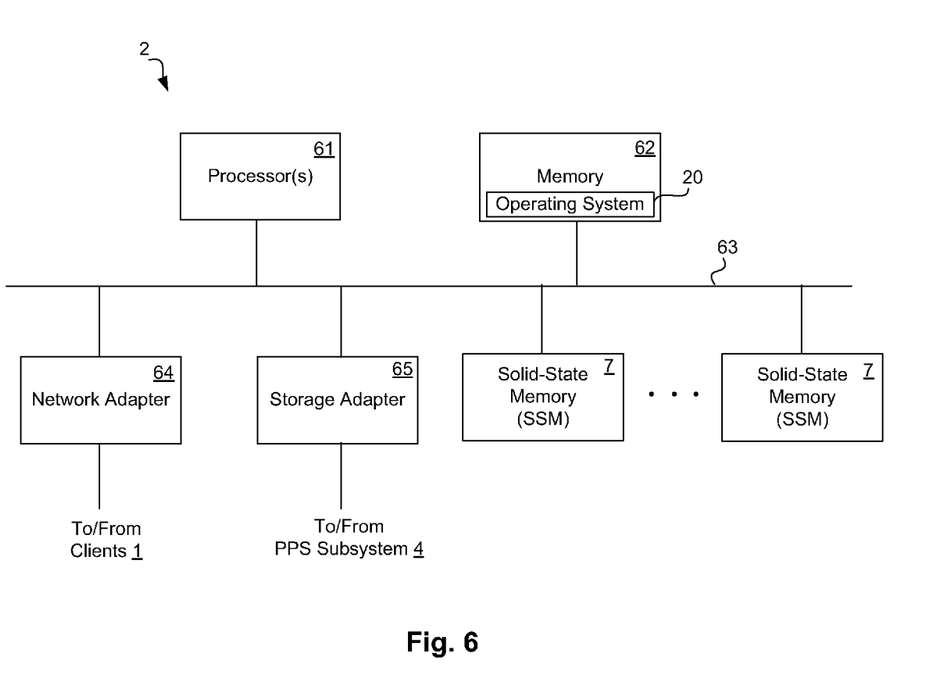
FIG. 6 is a high-level block diagram showing an example of the architecture of a storage server.

FIG. 6 is a high-level block diagram showing an example of the architecture of a storage server 2. The storage server 2 includes one or more processors 61 and memory 62 coupled to a interconnect 63. The interconnect 63 shown in FIG. 6 is an abstraction that represents any one or more separate physical buses, point-to-point connections, or both connected by appropriate bridges, adapters, or controllers. The interconnect 63, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 61 may include central processing units (CPUs) of the storage server 2 and, thus, control the overall operation of the storage server 2. In certain embodiments, the processor(s) 61 accomplish this by executing software or firmware stored in memory 62. The processor(s) 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 62 is or includes the main memory of the storage server 2. The memory 62 represents any form of random access memory (RAM), read-only memory (ROM), flash memory (as discussed above), or the like, or a combination of such devices. In use, the memory 62 may contain, among other things, at least a portion of the storage operating system 20 of the storage server 2.

Also connected to the processor(s) 61 through the interconnect 63 are a network adapter 64 and a storage adapter 65. The storage adapter 65 allows the storage server 2 to access the PPS subsystem 4 and may be, for example, a Fibre Channel adapter or SATA adapter. The network adapter 64 provides the storage server 2 with the ability to communicate with remote devices, such as clients 1, over an interconnect 3 and may be, for example, an Ethernet adapter or Fibre Channel adapter.

As noted above, the storage server 2 also includes SSMs 7, which are coupled to the processor(s) 61 through the interconnect 63. In some embodiments, the SSMs 7 are physically attached to the main motherboard (not shown) of the storage server 2. In still other embodiments, the SSMs 7 are implemented on a separate substrate within the storage server 2 (e.g., one or more DIMMs) or on a substrate that attaches to a connector on the storage server 2 (e.g., a USB memory stick).

Thus, a technique for using write allocation decisions to achieve a desired level of wear across a set of redundant solid-state memory devices in a network storage system has been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   determining a size of a quorum to be used when writing data to a storage subsystem that includes a plurality of solid-state storage devices, wherein the quorum is defined to include at least two of the plurality of solid-state storage devices, and wherein a plurality of quorums of said size can be defined from among the plurality of solid-state storage devices;
   making write allocation decisions for the storage subsystem, based on a write history and a replacement history of the plurality of solid-state storage devices, to implement a desired wear policy on the plurality of solid-state storage devices, wherein said making writing allocation decisions includes using fewer than all of the quorums of said size from among the plurality of solid-state storage devices, to cause two or more of the solid-state storage devices to have different-sized write workloads, but still using each of the plurality of solid-state storage devices for writing data; and
   storing data in the storage subsystem according to the write allocation decisions.

2. A method as recited in claim 1, wherein making write allocation decisions for the storage subsystem comprises making write allocation decisions to implement wear skewing across the plurality of solid-state storage devices.

3. A method as recited in claim 2, wherein write allocation decisions for the storage subsystem are made so as to unequally influence intentionally the expected lifespans of the solid-state storage devices by assigning different write workloads to two or more of the plurality of solid-state storage devices.

4. A method as recited in claim 3, wherein the write allocation decisions for the storage subsystem are based on a replacement history of the plurality of solid-state storage devices.

5. A method as recited in claim 4, wherein making write allocation decisions for the storage subsystem comprises:
modifying an assigned write workload to two or more of the solid-state storage devices in response to replacement of one of the solid-state storage devices.

6. A method as recited in claim 1, wherein the plurality of solid-state storage devices are nonvolatile solid-state storage devices.

7. A method as recited in claim 6, wherein the plurality of solid-state storage devices are flash memory devices.

8. A method comprising:
determining a size of a quorum to be used when writing data to a storage subsystem that includes a plurality of solid-state storage devices, wherein a quorum is defined to include at least two of the plurality of solid-state storage devices, and wherein a plurality of quorums of said size can be defined from among the plurality of solid-state storage devices;
making write allocation decisions for the storage subsystem according to a wear skewing policy, wherein said making write allocation decisions includes using fewer than all of the quorums of said size from among the plurality of solid-state storage devices, to cause two or more of the solid-state storage devices to have different-sized write workloads, but still using each of the plurality of solid-state storage devices for writing data; and
storing data in the storage subsystem according to the write allocation decisions to skew the wear across the plurality of solid-state storage devices so as to cause the wear rates of the plurality of solid-state storage devices to differ from each other.

9. A method as recited in claim 8, wherein making write allocation decisions for the storage subsystem comprises assigning different write workloads to two or more of the plurality of solid-state storage devices to unequally influence intentionally the expected lifespans of the solid-state storage devices.

10. A method as recited in claim 9, wherein said assigning different write workloads comprises selecting locations to which data are written from among the plurality of solid-state storage devices to unequally influence the expected lifespans of the solid-state storage devices.

11. A method as recited in claim 9, wherein making write allocation decisions for the storage subsystem comprises assigning data sets with different expected update frequencies to different ones of the plurality of solid-state storage devices, but still using each of the plurality of solid-state storage devices for writing data.

12. A method as recited in claim 11, wherein assigning data sets with different expected update frequencies to different ones of the plurality of solid-state storage devices comprises:
selecting randomly, with a bias, a write quorum for each of a plurality of writes.

13. A method as recited in claim 11, wherein assigning data sets with different expected update frequencies to different ones of the plurality of solid-state storage devices comprises:
applying a predefined storage policy to each of a plurality of writes to determine where data associated with each said write should be stored, wherein each said policy is based on properties of data to be written.

14. A method as recited in claim 11, further comprising:
observing properties of data written by a plurality of writes;
wherein assigning data sets with different expected update frequencies to different ones of the plurality of solid-state storage devices comprises adaptively determining where data should be stored in the plurality of solid-state storage devices, based on properties of the data to be written and the observed properties.

15. A method as recited in claim 14, wherein assigning data sets with different expected update frequencies to different ones of the plurality of solid-state storage devices further comprises:
selecting randomly, with a bias, a write quorum for each of a plurality of writes; and
using a write-out-of-place policy to apply the plurality of writes to the plurality of solid-state storage devices.

16. A method as recited in claim 9, wherein the plurality of solid-state storage devices have substantially identical actual storage capacities, and wherein making write allocation decisions for the storage subsystem is performed by a storage manager module and comprises the storage manager module assigning substantially different logical storage capacities to at least two of the plurality of solid-state storage devices, wherein each of said at least two solid-state storage devices makes use of its entire actual storage capacity.

17. A method as recited in claim 8, wherein making write allocation decisions for the storage subsystem is performed by a storage manager module, wherein at least two of the plurality of solid-state storage devices have substantially different actual storage capacities, and wherein said making write allocation decisions comprises the storage manager module assigning the same logical storage capacity to each of the at least two solid-state storage devices, and wherein each of said at least two solid-state storage devices makes use of its entire actual storage capacity.

18. A method as recited in claim 8, wherein the write allocation decisions for the storage subsystem are based on a maintenance history of the plurality of solid-state storage devices.

19. A method as recited in claim 18, wherein the write allocation decisions for the storage subsystem are based on a replacement history of the plurality of solid-state storage devices.

20. A method as recited in claim 8, wherein the plurality of solid-state storage devices are nonvolatile solid-state storage devices.

21. A method as recited in claim 20, wherein the plurality of solid-state storage devices are flash memory devices.

22. A storage server comprising:
a network interface through which to receive read requests and write requests from a set of clients over a network;
a storage interface through which to communicate with a storage subsystem that includes a plurality of solid-state storage devices; and
a processor to process the read requests and write requests, including applying a failure protection scheme by storing data redundantly in two or more of the plurality of solid state storage devices, and assigning different-sized write workloads to two or more of the plurality of solid-state storage devices by making write allocation decisions so as to cause the wear rates of the plurality of solid-state storage devices to differ from each other, wherein the write allocation decisions are based on a write history and a replacement history of the plurality of solid-state storage devices; wherein the processor determines a size of a quorum to be used for write requests, the quorum being defined to include at least two of the plurality of solid-state storage devices, and a plurality of quorums of said size being defined from among the plurality of solid-state storage devices; and wherein said making writing allocation decisions includes using fewer than all of the quorums of said size from among the plurality of solid-state storage devices, to cause two or more of the solid-state storage devices to have different-sized write workloads, but still using each of the plurality of solid-state storage devices for writing data.

23. A storage server as recited in claim 22, wherein the write allocation decisions are based on a maintenance history of the plurality of solid-state storage devices.

24. A storage server as recited in claim 22, wherein the storage manager reassigns write workloads to at least one of the solid-state storage devices in response to replacement of one of the solid-state storage devices.

25. A storage server as recited in claim 22, wherein making write allocation decisions comprises assigning different write workloads to two or more of the plurality of solid-state storage devices.

26. A storage server as recited in claim 22, wherein the plurality of solid-state storage devices are nonvolatile solid-state storage devices.

27. A storage server as recited in claim 26, wherein the plurality of solid-state storage devices are flash memory devices.

28. A storage server comprising:
a network interface through which to receive read requests and write requests from a set of clients over a network;
a storage interface through which to communicate with a storage subsystem that includes a plurality of solid-state storage devices; and
a processor to determine a size of a quorum to be used when writing data to the storage subsystem that includes the plurality of solid-state storage devices, wherein a quorum is defined to include at least two of the plurality of solid-state storage devices, and wherein a plurality of quorums of said size can be defined from among the plurality of solid-state storage devices; to make write allocation decisions for the storage subsystem according to a wear skewing policy, including using fewer than all of the quorums of said size from among the plurality of solid-state storage devices; and to store data in the storage subsystem according to the write allocation decisions to skew the wear across the plurality of solid-state storage devices, including causing two or more of the solid-state storage devices to have different-sized write workloads, but still using each of the plurality of solid-state storage devices for writing data.

* * * * *